United States Patent Office 3,345,379
Patented Oct. 3, 1967

3,345,379
7-IMIDOMETHYL-6-DEMETHYL-6-DEOXYTETRACYCLINES
Michael Joseph Martell, Jr., Pearl River, N.Y., and Andrew Stephen Tomcufcik, Old Tappan, N.J., assignors to American Cyanamid Company, Stamford, Conn., a corporation of Maine
No Drawing. Filed Feb. 26, 1965, Ser. No. 435,705
16 Claims. (Cl. 260—326.13)

ABSTRACT OF THE DISCLOSURE

This disclosure describes compounds of the class of 7-amidomethyl-6-deoxytetracyclines and 7-imidomethyl-6-deoxytetracyclines useful as antibacterial and antifungal agents.

---

This invention relates to new organic compounds and, more particularly, is concerned with novel 7-amidomethyl- and 7-imidomethyl-6-deoxytetracyclines which may be represented by the following general formula:

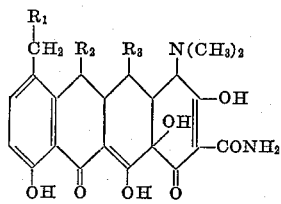

wherein $R_2$ is hydrogen or methyl; $R_3$ is hydrogen or hydroxy; and $R_1$ is an amido or imido moiety selected from the group consisting of

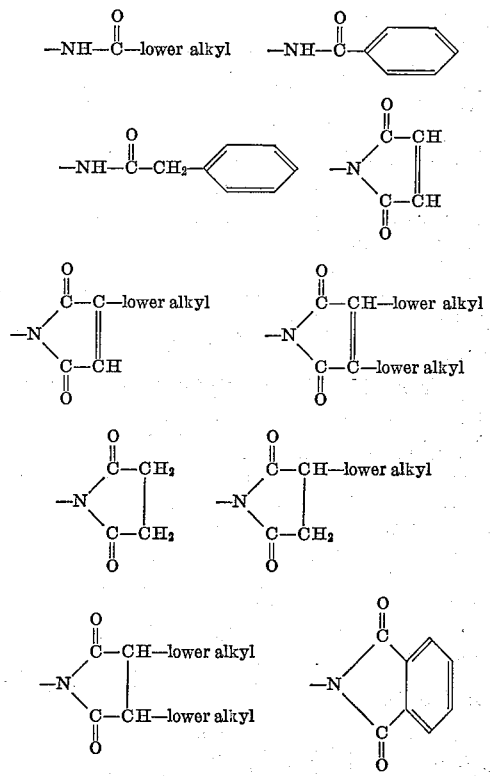

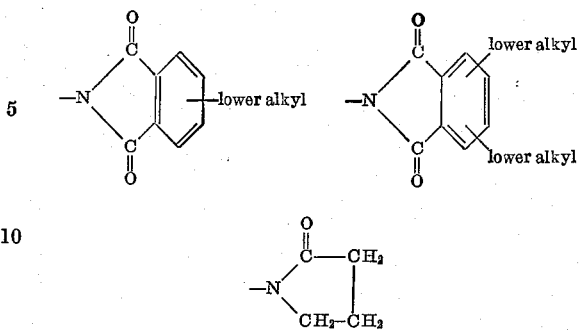

with the proviso that when $R_3$ is hydroxy, then $R_2$ must be methyl. Suitable lower alkyl groups contemplated by the present invention are those having up to about 4 carbon atoms.

The novel compounds of the present invention are, in general, yellow crystalline solids, somewhat soluble in organic solvents such as lower alkanols, ethyl acetate, lower alkoxy alkanols, and the like; but relatively insoluble in nonpolar solvents such as ether, cyclohexane, petroleum ether, and the like.

The organic bases of this invention form nontoxic, acid-addition salts with a variety of organic and inorganic salt-forming agents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic, succinic, tataric, acetic, benzoic, gluconic, ascorbic and the like. For purposes of this invention, the free bases are equivalent to their nontoxic acid-addition salts.

Among the compounds within the scope of the present invention are the following: 7-acetamidomethyl-6-deoxytetracycline, 7 - acetamidomethyl-5-hydroxy-6-deoxytetracycline, 7-acetamidomethyl-6-demethyl - 6 - deoxytetracycline, 7-benzamidomethyl - 6 - deoxytetracycline, 7-benzamidomethyl - 5 - hydroxy-6-deoxytetracycline, 7-benzamidomethyl - 6 - demethyl-6-deoxytetracycline, 7-phenylacetamidomethyl - 6 - deoxytetracycline, 7-phenylacetamidomethyl - 5 - hydroxy-6-deoxytetracycline, 7-phenylacetamidomethyl - 6 - demethyl - 6 - deoxytetracycline, 7-maleimidomethyl - 6 - deoxytetracycline, 7-maleimidomethyl - 5 - hydroxy-6-deoxytetracycline, 7-maleimidomethyl - 6 - demethyl-6-deoxytetracycline, 7-(2-methylmaleimidomethyl) - 6 - deoxytetracycline, 7-(2-methylmaleimidomethyl) - 5 - hydroxy-6-deoxytetracycline, 7-(2-methylmaleimidomethyl) - 6 - demethyl-6-deoxytetracycline, 7-(2,3 - dimethylmaleimidomethyl)-6-deoxytetracycline, 7-(2,3 - dimethylmaleimidomethyl)-5-hydroxy - 6 - deoxytetracycline, 7-(2,3-dimethylmaleimidomethyl) - 6 - demethyl-6-deoxytetracycline, 7-succinimidomethyl - 6 - deoxytetracycline, 7-succinimidomethyl - 5 - hydroxy-6-deoxytetracycline, 7-succinimidomethyl - 6 - demethyl-6-deoxytetracycline, 7-(2-methylsuccinimidomethyl) - 6 - deoxytetracycline, 7-(2-methylsuccinimidomethyl) - 5 - hydroxy-6-deoxytetracycline, 7-(2-methylsuccinimidomethyl) - 6 - demethyl-6-deoxytetracycline, 7-(2,3 - dimethylsuccinimidomethyl) - 6-deoxytetracycline, 7-(2,3 - dimethylsuccinimidomethyl)-5-hydroxy - 6 - deoxytetracycline, 7 - (2,3-dimethylsuccinimidomethyl) - 6 - demethyl-6-deoxytetracycline, 7- phthalimidomethyl - 6 - deoxytetracycline, 7-phthalimidomethyl - 5 - hydroxy-6-deoxytetracycline, 7-phthalimidomethyl - 6 - demethyl-6-deoxytetracycline, 7-(4-methylphthalimidomethyl) - 6 - deoxytetracycline, 7-(4-methylphthalimidomethyl) - 5 - hydroxy-6- deoxytetracycline, 7-(4-methylphthalimidomethyl) - 6 - demethyl-6-deoxytetracycline, 7-(4,5 - dimethylphthalimidomethyl) - 6 - deoxytetracycline, 7-(4,5 - dimethylphthalimidomethyl)-5-hydroxy - 6 - deoxytetracycline and 7-(4,5-dimethylphthalimidomethyl) - 6 - demethyl-6-deoxytetracycline.

The novel compounds of the present invention are biologically active and have been found to possess antibacterial and antifungal activity. The half maximal inhibitory concentrations, expressed in micrograms per milliliter, for some typical compounds of the present invention against *Staphylococcus aureus* ATCC 6538P when measured by a standard turbidimetric procedure (Grove, D. C. and Randall, W. A. in Assay Methods of Antibiotics, Medical Encyclopedia, Inc., New York, 1955, pp. 48–50) are set forth in the following table:

TABLE I

| Compound: | Concentrations effecting half-maximal inhibition |
|---|---|
| 7-(2-methylmaleimido)methyl-6-demethyl-6-deoxytetracycline | 0.00134 |
| 7-(2,3-dimethylmaleimido)methyl-6-demethyl-6-deoxytetracycline | 0.0068 |
| 7-succinimidomethyl-6-demethyl-6-deoxytetracycline | 0.043 |
| 7-phthalimidomethyl-6-demethyl-6-deoxytetracycline | {0.0056 / 0.0055} |
| 7-maleimidomethyl-6-demethyl-6-deoxytetracycline | 0.0024 |
| Tetracycline | 0.0165 |

The high antibacterial activity of the novel compounds of the present invention (for example, the first compound in the above table is 12 times as active as tetracycline) makes them useful as additives to materials which are subject to microbial deterioration such as cutting oils, jet fuels and diesel oils. They are also useful in soaps, shampoos and topical compositions for the treatment of wounds and burns. The antifungal activity of the novel compounds of the present invention makes them useful as fungus inhibitors in leather tanning.

The novel compounds of the present invention may be readily prepared by the interaction of an appropriate 7-unsubstituted tetracycline and an N-hydroxymethylamide or N-hydroxymethylimide as set forth in the following reaction scheme:

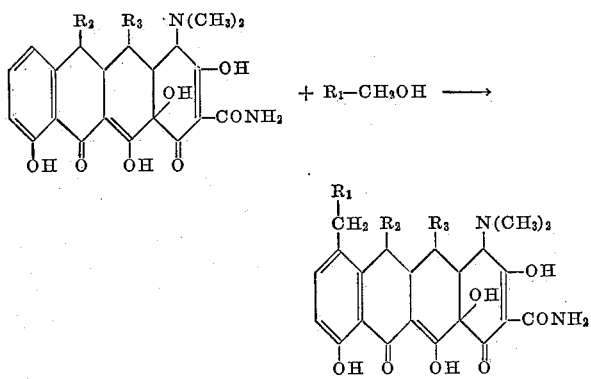

wherein $R_1$, $R_2$ and $R_3$ are as hereinabove defined with the proviso that $R_1$ may not be a succinimido moiety. This condensation is carried out in concentrated strong acid such as sulfuric acid, methanesulfonic acid, benzenesulfonic acid, or the like. The reaction may also be carried out in anhydrous liquid hydrogen fluoride. The condensation is ordinarily carried out within a temperature range of about 0° C. to about 50° C. over a period of time ranging from about 10 minutes to 2 hours or so.

Ordinarily in this condensation one uses an excess of half an equivalent of N-hydroxymethylimide or amine. The succinimido derivatives (where $R_1$ is a succinimido moiety in the above reaction scheme) do not form directly, but may be readily prepared by the catalytic hydrogenation of the corresponding maleimido derivatives. The catalytic hydrogenation of the maleimido derivatives may be readily carried out at atmospheric pressure and room temperature employing platinic oxide as catalyst.

The invention will be described in greater detail in conjunction with the following specific examples.

*Example 1.—7-maleimidomethyl-6-demethyl-6-deoxytetracycline*

A solution of 453.0 mg. (1 mmole) of 6-demethyl-6-deoxytetracycline hydrochloride in 5 ml. of concentrated (96%) sulfuric acid at room temperature was treated with 190.0 mg. (1.5 mmole) of N-hydroxymethylmaleimide. The solution was stirred at room temperature for 35 minutes, then poured into 150 ml. of dry ether. The precipitate was filtered off, washed well with dry ether, and dried, weight 500 mg. The precipitate was dissolved in 18 ml. of water and the pH was adjusted to 5.0 with 1 N sodium hydroxide solution. The material which precipitates is filtered off, washed with two 1 ml.-portions of water and dried in vacuo, yield 305 mg. The material was purified by column partition chromatography on neutral (acid washed Celite®. A column was packed using 65 g. of Celite moistened with 37.5 ml. of the aqueous layer of a mixture of cyclohexane, dioxane and water in the proportions 6:5:1. The sample (85 mg.) was dissolved in 5 ml. of aqueous phase and packed with 10 g. of Celite on the top of the column. Pure product was eluted in the fourth and fifth hold-back volumes of the column as the column was developed with upper phase.

*Example 2.—7-succinimidomethyl-6-demethyl-6-deoxytetracycline*

A solution of 315 mg. (0.6 mmole) of chromatographically pure 7-maleimidomethyl-6-demethyl-6-deoxytetracycline in 6 ml. of methyl Cellosolve and 100 mg. of platinic oxide was hydrogenated at atmospheric pressure and room temperature. Uptake (32 ml., theory 34 ml.) was complete in 1.5 hours. The catalyst was filtered off and the filtrate evaporated to dryness in vacuo. The residue was triturated with anhydrous ether and filtered off and dried, weight 260 mg.

*Example 3.—7-phthalimidomethyl-6-demethyl-6-deoxytetracycline*

By replacing the N-hydroxymethylmaleimide employed in Example 1 with an equilmolecular quantity of N-hydroxymethylphthalimide and following substantially the same procedure described in Example 1, there is obtained the 7-phthalimidomethyl-6-demethyl-6-deoxytetracycline.

*Example 4.—N-hydroxymethyl-2-methylmaleimide*

A mixture of 1.11 g. (10 mmole) of 2-methylmaleimide (Brown, et al. J. Chem. Soc., 1957, 2882) and 0.81 ml. of 37% formaldehyde was stirred at room temperature as the pH was adjusted to 5.0 with 5% aqueous sodium hydroxide solution. Solution occurred and the solution was stirred for 3 hours at room temperature. The water was removed in vacuo and the residue solidified upon scratching, weight 1.32 g. The material was recrystallized from a mixture of benzene and Skellysolve B (mixed hexanes), M.P. 65–66° C.

*Example 5.—N-hydroxymethyl-2,3-dimethylmaleimide*

The procedure of Example 4 is repeated, substituting an equimolecular amount of 2,3-dimethylmaleimide for the 2-methylmaleimide employed in that example. There is thus obtained the N-hydroxymethyl-2,3-dimethylmaleimide, M.P. 45° C.

*Example 6.—7-(2-methylmaleimido)methyl-6-demethyl-6-deoxytetracycline*

In place of the N-hydroxymethylmaleimide of Example 1 there is employed an equimolecular quantity of N-hydroxymethyl-2-methylmaleimide whereby the 7-(2-methylmaleimido)methyl-6-demethyl-6-deoxytetracycline is obtained in equally good yield.

*Example 7.—7-(2,3-dimethylmaleimido)methyl-6-demethyl-6-deoxytetracycline*

By replacing the N-hydroxymethylmaleimide employed in Example 1 with an equimolecular quantity of N-hydroxymethyl-2,3-dimethylmaleimide and following substantially the same procedure described in Example 1, there is obtained the 7-(2,3-dimethylmaleimido)methyl-6-demethyl-6-deoxytetracycline.

*Example 8.—7-benzamidomethyl-6-demethyl-6-deoxytetracycline*

The procedure of Example 1 is repeated, substituting an equimolecular amount of N-hydroxymethylbenzamide for the N-hydroxymethylmaleimide employed in that example. There is thus obtained the 7-benzamidomethyl-6-demethyl-6-deoxytetracycline.

*Example 9.—7-pyrrolidonylmethyl-6-demethyl-6-deoxytetracycline*

In place of the N-hydroxymethylmaleimide of Example 1 there is employed an equimolecular quantity of N-hydroxymethylpyrrolidone whereby the 7-pyrrolidonylmethyl-6-demethyl-6-deoxytetracycline is obtained in equally good yield.

*Example 10.—7-citraconimidomethyl-6-demethylanhydrotetracycline*

A solution of 412 mg. (1 mmole) of 6-demethylanhydrotetracycline in 10 ml. of anhydrous hydrofluoric acid was treated with N-hydroxymethylcitraconimide (155 mg., 1.1 mmole) with stirring in an ice bath. The solution was stirred in the ice bath for 50 minutes and the hydrofluoric acid removed in a stream of nitrogen. The residue was dissolved in 40 ml. of water and neutralized to pH 4.5 with 15% aqueous sodium hydroxide solution. The yellow precipitate was filtered off, washed well wtih water and dried, weight 460 mg. The material was chromatographed on neutral (acid washed) Celite® using a system of heptane, ethyl acetate, methyl Cellosolve, water (75:25:17:6) for elution. The first product, 7-citraconimidomethyl-6-demethylanhydrotetracycline, is eluted in holdback volumes 2.5 through 4.0. ($R_f$ n-butanol phosphate buffer pH 2=0.83) [in vitro turbidimetric assay 439 γ/ml. (TC=1000]. The second production, 7,9-dicitraconimidomethyl-6-demethylanhydrotetracycline, was eluted in the eighth through twelfth holdback volumes ($R_f$ n-butanol phosphate buffer pH 2=0.84) [in vitro turbidimetric assay 49 γ/ml. (TC=1000)].

*Example 11.—7-maleimidomethyl-6-demethylanhydrotetracycline*

By replacing the 6-demethyl-6-deoxytetracycline hydrochloride employed in Example 1 with an equimolecular quantity of 6-demethylanhydrotetracycline and following substantially the same procedure described in Example 1, there is obtained the 7-maleimidomethyl-6-demethylanhydrotetracycline; $R_f$ n-butanol, concentrated ammonia, water (4:1:5)=0.1 [in vitro turbidimetric assay 450 γ/ml. (TC=1000)].

The partition chromatography data for typical compounds of the present invention is set forth in the following table:

TABLE II

| Compound | $R_f$* | Partition Chromatography Data |
|---|---|---|
| 7-phthalimidomethyl-6-demethyl-6-deoxytetracycline. | 0.90 | H:EA:MC:W,** 2:5:2:1; HBV,*** 0.4–0.6. |
| 7-maleimidomethyl-6-demethyl-6-deoxytetracycline. | 0.68 | C:D:W, 6:5:1; HBV, 3.2–5.0. |
| 7-(2-methylmaleimido)methyl-6-demethyl-6-deoxytetracycline. | 0.79 | C:D:W, 7:4:1; HBV, 6.5–9.0. |
| 7-(2,3-dimethylmaleimido)methyl-6-demethyl-6-deoxytetracycline. | 0.89 | H:EA:MC:W, 65:35:20:10; HBV, 7.4–10.0. |
| 7-benzamidomethyl-6-demethyl-6-deoxytetracycline. | 0.89 | H:EA:M:W, 50:50:15:4. |
| 7-succinimidomethyl-6-demethyl-6-deoxytetracycline. | 0.49 | |
| 7-pyrrolidonylmethyl-6-demethyl-6-deoxytetracycline. | 0.40 | |

* $R_f$ is for the system n-butanol-phosphate buffer pH 2.0.
** Solvent symbols.—H=n-heptane; EA=ethylacetate; MC=methylcellosolve; W=water; M=methanol; C=cyclohexane; D=dioxane.
*** HBV=Hold back volume. (Column solvent retention.)

What is claimed is:
1. A compound selected from the group consisting of those of the formula:

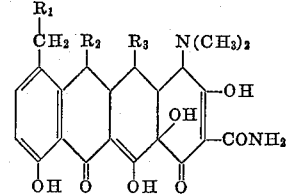

wherein $R_2$ is selected from the group consisting of hydrogen and methyl, $R_3$ is selected from the group consisting of hydrogen and hydroxy, and $R_1$ is selected from the group consisting of

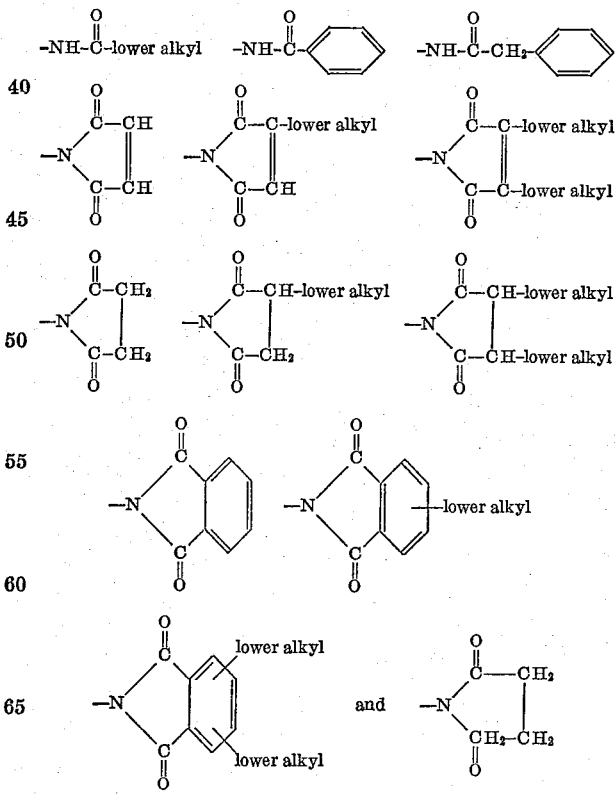

with the proviso that when $R_3$ is hydroxy then $R_2$ must be methyl; and the non-toxic acid-addition salts thereof.
2. 7-acetamidomethyl-6-deoxytetracycline.
3. 7-benzamidomethyl-6-demethyl-6-deoxytetracyline.
4. 7 - phenylacetamidomethyl-5-hydroxy-6-deoxytetracycline.

5. 7-maleimidomethyl-6-demethyl-6-deoxytetracycline.
6. 7 - (2-methylmaleimidomethyl) - 6 - demethyl - 6-deoxytetracycline.
7. 7 - (2,3-dimethylmaleimidomethyl)-6-demethyl-6-deoxytetracycline.
8. 7-succinimidomethyl-6-demethyl-6-deoxytetracycline.
9. 7-(2-methylsuccinimidomethyl)-6-deoxytetracycline.
10. 7 - (2,3-dimethylsuccinimidomethyl)-5-hydroxy-6-deoxytetracycline.
11. 7 - phthalimidomethyl-6-demethyl-6-deoxytetracycline.
12. 7 - (4-methylphthalimidomethyl)-5-hydroxy-6-deoxytetracycline.
13. 7 - (4,5-dimethylphthalimidomethyl)-6-demethyl-6-deoxytetracycline.
14. 7 - pyrrolidonylmethyl-6-demethyl-6-deoxytetracycline.
15. 7 - citraconimidomethyl-6-demethylanhydrotetracycline.
16. 7-maleimidomethyl-6-demethylanhydrotetracycline.

References Cited

UNITED STATES PATENTS 3,275,652   9/1966   Martell et al. _____ 260—559

NICHOLAS S. RIZZO, *Primary Examiner.*